United States Patent [19]

Riedel

[11] 4,146,075
[45] Mar. 27, 1979

[54] EASY-MOUNT TIRE-CHAIN ASSEMBLY

[75] Inventor: Tilo Riedel, Eching, Fed. Rep. of Germany

[73] Assignee: Sesamat Anstalt, Chiasso, Switzerland

[21] Appl. No.: 748,547

[22] Filed: Dec. 8, 1976

[30] Foreign Application Priority Data

Dec. 12, 1975 [DE]   Fed. Rep. of Germany ....... 2556115
Mar. 17, 1976 [DE]   Fed. Rep. of Germany ....... 2611273
Nov. 5, 1976 [DE]   Fed. Rep. of Germany ....... 2650703

[51] Int. Cl.² ........................................... B60C 27/00
[52] U.S. Cl. ............................. 152/213 R; 152/213 A; 152/225 R
[58] Field of Search ............... 152/213 R, 213 A, 217, 152/219, 221, 225 R, 231, 232, 233, 241, 242, 218

[56] References Cited

U.S. PATENT DOCUMENTS

| | | | |
|---|---|---|---|
| 1,935,035 | 11/1933 | Levi | 152/213 A |
| 2,094,228 | 9/1937 | Zook | 152/213 A |
| 2,198,478 | 4/1940 | Hewel | 152/241 |
| 2,455,878 | 12/1948 | Sadowsky | 152/219 |
| 2,507,037 | 5/1950 | Miller | 152/225 R |
| 2,976,902 | 3/1961 | Pierre | 152/217 |
| 3,762,456 | 10/1973 | Clouston | 152/213 A |
| 3,805,867 | 4/1974 | Cox | 152/213 R |
| 3,884,283 | 5/1975 | Engel | 152/213 A |
| 3,918,504 | 11/1975 | Prokesch | 152/217 |

FOREIGN PATENT DOCUMENTS

2240116  3/1975  France ..................... 152/217

*Primary Examiner*—Francis S. Husar
*Assistant Examiner*—Lawrence E. Williams
*Attorney, Agent, or Firm*—Michael J. Striker

[57] ABSTRACT

A tire-chain assembly for a vehicle-mounted wheel basically comprises annular inner and outer holders respectively engaging the inner and outer faces of the wheel. At least one traction chain crisscrosses over the road-engaging surface of the wheel between the two holders. The inner holder is of variable diameter, so that it can be fitted over the tire and then have its diameter decreased to allow the traction chain to be tightened on the wheel. Mechanism on this inner holder is connected via a flexible element that passes over the road-engaging surface of the wheel to the outer face of the wheel so that a pull on this mechanism will reduce the diameter of the inner holder and tighten the chain assembly on the wheel. The outer end of this flexible element, which may be a chain, is then secured to the holder on the outer surface of the wheel. A chain comprising a plurality of locking dogs or hooks may be constituted as the tightening mechanism so as to ensure self-locking of the tire-chain assembly on the wheel.

14 Claims, 35 Drawing Figures

EASY-MOUNT TIRE-CHAIN ASSEMBLY

BACKGROUND OF THE INVENTION

The present invention relates to a tire-chain assembly. More particularly this invention concerns a tire chain adapted to be mounted on a ground-engaging wheel that is on a motor vehicle.

In spite of the considerable advances in tire technology in recent times resulting in the design of relatively effective so-called snowtires for maximum traction under snowy or icy conditions it is essential to use tire chains. In the most common system these chains are each merely constituted as a ladder-like lattice which is laid on the ground ahead of the tire on which it is to be mounted. The vehicle is then advanced so that the wheel rests on a portion of this chain lattice, then the chain is wrapped around the tire and secured at the inner face of the tire, that is the face turned toward the vehicle, and at the outer face of the tire. Then a chain adjuster, typically a large elastic ring provided with a plurality of S-hooks, is secured to the chain at various locations on its periphery on the outer face of the tire to hold it tightly on the wheel.

Such mounting of tire chains is an extremely onerous task, almost invariably complicated by the fact that it is done under snowy and cold conditions. The only way known to ease this relatively burdensome task is to jack up the wheel on which it is being mounted. Obviously, such a procedure, which must be done at least for the two traction wheels of the vehicle, takes a considerable time.

Various tire-chain assemblies have been designed which were intended to simplify the mounting operation. No such assembly has ever in practice proven itself by being relatively easy to mount on the wheel, yet at the same time of low cost and long service life.

SUMMARY OF THE INVENTION

It is therefore an object of the present invention to provide an improved tire-chain assembly.

Another object is the provision of tire chains which can readily and quickly be mounted on a vehicle wheel which is standing on the ground.

Yet another object is to provide such an assembly wherein the traction chains, that is the chains overlying the ground-engaging surface of the tire and serving to increase the traction of the vehicle, are securely held in place and properly aligned on the tire.

Yet another object is to provide a tire chain assembly which can be produced at relatively low cost, yet which has a long service life.

These objects are attained according to the present invention in a tire-chain assembly comprising an outer holder on the outer face of the wheel, an annular inner holder of variable diameter on the inner face of the wheel, at least one traction chain extending back and forth between the holders over the ground-engaging surface of the wheel and means for tightening this traction chain on the ground-engaging surface. This means includes a flexible elongated and generally nonextensible element which extends over the ground-engaging surface of the wheel or tire to the outer holder. The means is set-up so that as this element is withdrawn toward the outer face of the tire the diameter of the inner holder is decreased. In addition means is provided on the outer holder for securing the other end of this flexible element thereon so as to arrest the tightening means in the position determined by the flexible element and thereby maintain the diameter of the inner holder without change.

Thus, with the system according to the present invention the inner holder at least is of variable diameter so that it can be opened up wide enough to fit over the ground-engaging wheel of the vehicle. Thereupon, the flexible element which is connected to the inner holder and extends over the ground-engaging surface to the outer face can be pulled by the user so as to reduce the diameter of the inner holder and tighten the traction chains on the wheel. Thereafter the other end of this flexible element is secured to the outer holder so as to set the chain assembly on the wheel.

According to other featues of this invention each of these holders is formed as a ring or annulus of relatively stiff metal rod. The inner holder, of course, must be formed of at least two sections which are hinged together or connected together by means of a flexible ring portion so that the diameter of the inner holder can be increased. The outer holder may be similarly constituted or may be a simple ring of fixed diameter, as it is not necessary to open up the outer holder to fit it over the wheel.

According to another feature of this invention the inner holder may be formed as one bight of a single endless rod having another bight constituting the outer portion. These two bight are connected together by connecting portions which run over the road-engaging surface of the tire. The spacing between the two connecting portions on the tire surface is generally proportional to the diameter of the inner and outer rings. In such an arrangement the tightening means may constitute an anchor on one of these connecting portions for the one end of the element and an eye or guide on the other connecting portion so that when the element is pulled the guide eye and the anchor are drawn toward each other. This decreases the spacing between the two connecting portions and therefore decreases the diameters of the inner and outer holders so as to tighten the traction chain on the ground-engaging surface of the wheel.

The flexible element according to this invention may be a relatively rugged link-type chain. It is also possible to use a metallic cable or even a cable of a new relatively durable synthetic-resin material such as an acrylonitrile-butadiene-styrene. The traction chains which crisscross back and forward over the ground-engaging surface of the tire are preferably of galvanized steel, and may be provided with so-called wedge bars for increasing tire grip. The holders are typically formed mainly of steel rod having some flexibility, but with the flexibility of the inner holder being established by a separate portion of increased flexibility a hinge, or the like. Each of these holders is, as mentioned above, of generally annular shape and is provided with a plurality of angularly spaced guides for the traction chains. These guides may be U-shaped clips, formations in the holders, or spacer sleeves on the rods constituting the holders so as to maintain the proper spacing between adjacent sections of the traction chain.

According to another feature of this invention the inner holder, which has a pair of end portions whose relative spacing is generally directly proportional to the diameter of this inner holder, is provided at one of these end portions with a formation and is connected at the other end portion to a link-type dog lockingly engageable with this formation and itself connected to the flexible element described above. The formation may be a simple eye formed at the one end portion of the inner holder. The dog may be so constructed that it can pass through the eye when aligned longitudinally therewith, but that when aligned transversely thereto it cannot pass back through and, therefore, prohibits displacement of the other end portion away from the one end portion. Such a dog may be V-shaped or generally straight and a plurality of such dogs may be connected together via links chain-fashion for allowing the assembly to be adjusted for various different diameters.

It is also within the scope of this invention to form the dog generally as a hook engageable with the eye and connected at one end to the other end portion and at the opposite end to the flexible element, the intermediate or central region forming a notch lockingly engageable with the eye. This hook may be connected or pivoted directly on the other end portion, or may be connected thereto via one or more links. It is also within the scope of this invention to provide a plurality of such hooks connected to one another chain-fashion or connected and alternating with a plurality of links. Once again such an arrangement allows the system to be used for various different diameters to that a single tire-chain assembly can accomodate several different sizes of tire.

According to yet another feature of this invention the tightening means may comprise a simple clip carried on the outer holder and of the type formed with a slot that can hold a chain constituting the flexible element. It is also possible to provide a ratchet-type windup arrangement to allow the flexible element to be tightly tensioned, or to connect the outer end of the flexible element to the outer holder through a relatively stiff spring. This latter arrangement insures constant tension on the assembly. Furthermore, since this spring does not extend in a direction which would normally unload it when the wheel rotates, such tension is insured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

SPECIFIC DESCRIPTION OF PREFERRED EMBODIMENTS

Figures 1, 2, 3, 4, 5:
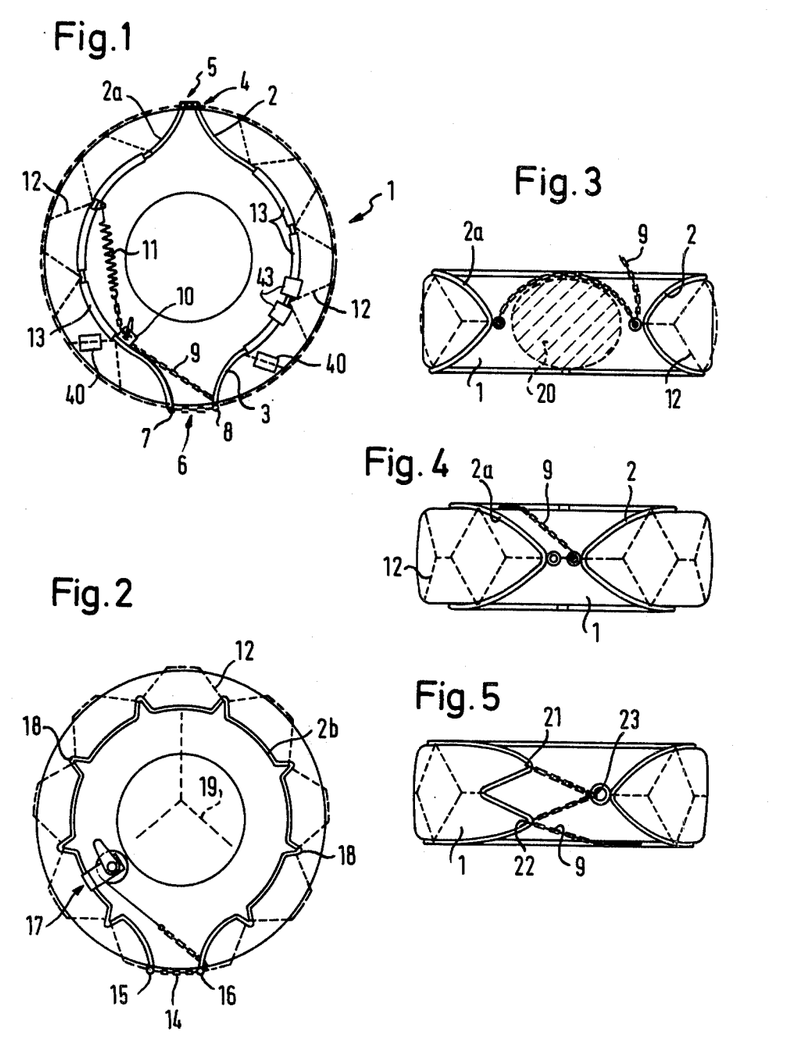
FIG. 1 is a side view of the outer face of a tire carrying a first embodiment of the tire-chain assembly according to this invention.
FIG. 2 is a view similar to FIG. 1 illustrating a second embodiment of the tire-chain assembly.
FIGS. 3 and 4 are bottom views of the assembly of FIG. 1 shown before and after tightening, respectively.
FIG. 5 is a bottom view of the assembly of FIG. 2.

As shown in FIGS. 1, 3, and 4 a tire-chain assembly is adapted to be mounted on a motor-vehicle tire or wheel 1 having an outer surface 1' which is turned away from the vehicle and an inner surface 1" which is turned toward the vehicle and is normally relatively inaccessible when the tire is on the vehicle and is engaging the ground. This tire-chain assembly comprises a pair of like inner and outer holder elements each formed of a pair of sections 2 and 2a. These sections pass at regions 5 and 6 over the ground-engaging surface of the tire 1. At the region 5 they are joined together by a clip 4 so that the two sections 2, which are formed of a single steel wire bent into the illustrated shape, are hinged at 5 on the two sections 2a which are identical thereto. A flexible element 9, here a standard twist-link chain, is connected as best shown in FIG. 3 at one end to the connection part 7 between the two portions 2a and passes through an eye 8 at the other connecting part between the two sections 2. This chain 9 then passes to the outer face 1' of the wheel 1 where it is engaged in a clip 10, a spring 11 serving to keep the element 9 under continuous tension.

In addition, traction chains 12 crisscross over the road-engaging surface of the tire and are maintained in the necessary positions by means of tubular guides or sleeves 13 fitted over the roads constituting the sections 2 and 2a. Rollers 40 may be provided on the chains 12 in order to assist in the fitting of the arrangement to the wheel 1, and thickened regions 43 may be formed on the rods constituting the inner and outer holders to replace the guide sleeves 13.

The tire-chain assembly shown in FIGS. 1, 3, and 4 is mounted on the wheel while it is standing on the ground and engaging the ground at a region indicated at 20 in FIG. 3. The two portions 2 and 2a of each of the holders are spread apart widely enough so as to allow them to fit over the outer periphery of the tire, the hinge 4 being up and the region 6 being down. After this fitting operation the chain 9 is pulled as tight as possible, passing around the region 20 as indicated in FIG. 3. The vehicle is then rolled slightly forwardly, so that the region 6 no longer is aligned at the region 20. The user then pulls the chain again toward the outer face so as to bring the regions 7 and 8 very close together as shown in FIG. 4, thereby tightening the traction chains securely on the wheel 1. The chain 9 is then slipped into the clip 10 which may be constructed as described with reference to FIGS. 29–32 below, and the spring 11 is attached to ensure that the system will not maladjust itself or come loose.

The arrangement shown in FIGS. 2 and 5 is similar to that shown in FIGS. 1, 3, and 4, but here the two-section assembly for the inner and outer holes is not used. The outer holder 2b here, which is identical to the not illustrated inner holder, is formed of a single flexible steel wire having a plurality of bent-out regions 18 forming a succession of angularly spaced seats for the traction chains 12. In addition the connecting part 15 is formed with a pair of regions 21 an 22 constituted as V-shaped areas open away from the connecting part 16 of the other section of each of the holders 2b. A flexible chain 9 here constituting a tightening element 14 is connected at one end to the anchor formed by the bight 21, then passes through an eye 23 provided on the connecting part 16, then is looped again through the bight 22, and passes on the outer face of the tire to a ratchet-type tightening mechanism 17 having a one-way clutch which can be wound very tightly. It is also possible to provide cross struts as indicated at 19 on the outer face of the tire to secure the chain 9.

Figure 6:
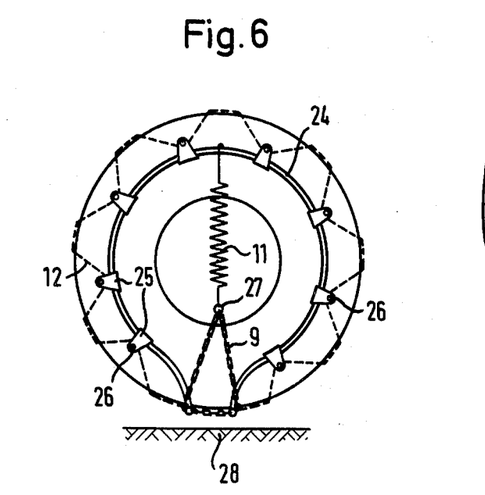
FIGS. 6 and 7 are views corresponding to FIGS. 2 and 5 of a third embodiment of the tire-chain assembly.
Figure 7:
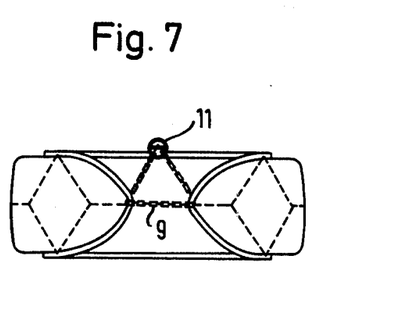

In FIG. 6 an arrangement is shown having an outer holder 24 constructed substantially the same way as the outer holder of FIGS. 2 and 5, provided with a plurality of U-shaped clips 25 having rollers 26 serving to guide the chains 12. In addition, a single endless chain 9 passes over the confronting parts 15 and 16, which are here formed substantially as shown in FIG. 4, and are connected at 27 to an eye carried on one end of the spring 11. The use of such an endless chain gives a considerable mechanical advantage, pulley-fashion, so that the force of the spring 11 is sufficient to hold the assembly tightly on the wheel 1. Such an arrangement can be jacked up above the ground 28 for mounting of the chain assembly, although it is equally possible to mount it directly on the ground as described with reference to FIGS. 1, 3, and 4.

Figure 8:
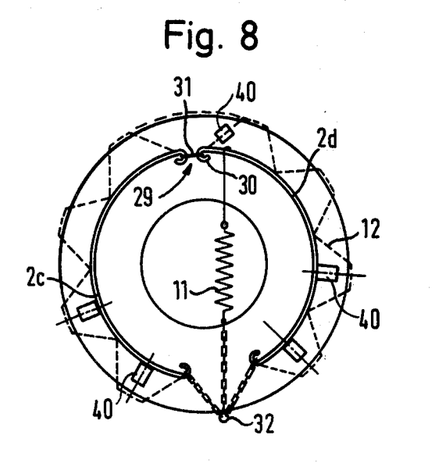
FIGS. 8 and 9 are side and bottom views of a fourth embodiment of the tire-chain assembly according to this invention.
Figure 9:
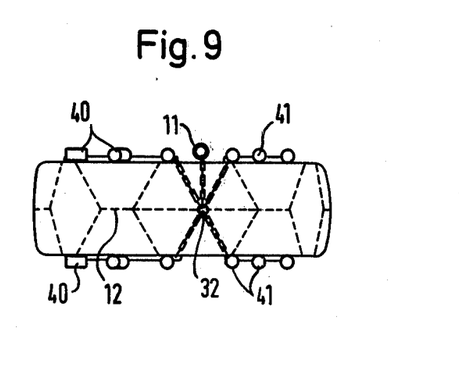

FIG. 8 shows another arrangement wherein the outer holder is formed by a pair of arcuate and substantially semi-circular rods 2c and 2d having end portions formed as eyes 30 and connected together at 29 via a link or ring 31 forming a hinge. The eyes 30 at the other ends of each of these sections 2c and 2d are connected to respective chains 9 passing through a common eye 32 on the road-engaging surface and thence passing to the spring 11. In this arrangement the rollers 40 may be provided as shown on the elements 2c and 2d, or on the chain 12. It is also possible to use ball-type rollers as shown at 41 in FIG. 9.

Figure 10:
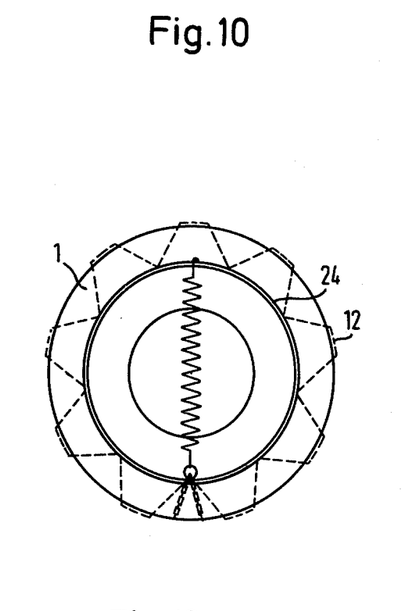
FIGS. 10 and 11 are side views of the outer and inner faces respectively of a fifth embodiment of the tire-chain assembly in accordance with the present invention.
Figure 11:
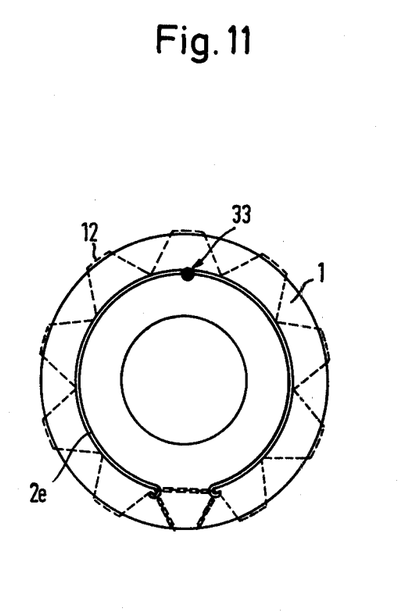
Figure 12:
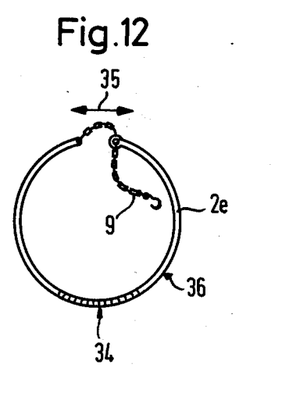
FIGS. 12, 13, and 14 are side views of three inner holders according to this invention.
Figure 13:
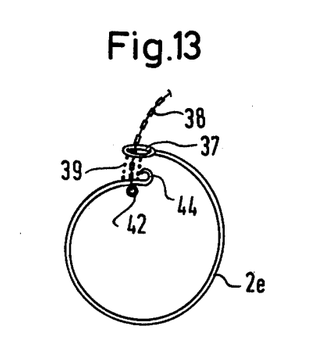

In FIGS. 10 and 11 a system is shown wherein the outer holder 24 is formed as a ring of fixed diameter. The inner holder is constituted by a pair of identical generally semi-circular rods 2e joined together at 33. This pivot or hinge 33 may be replaced a shown in FIG. 12 in a holder 2e' by a flexible region 34 between a pair of relatively rigid regions 36. This allows deflection of the ends of the two regions 36 apart as shown by arrow 35. It is also possible as shown in FIG. 13 to use an inner holder 2e" which is overall flexible and which is provided at its one end with an eye 37 and at its other end with a hook 44 biased away fron the eye 37 by a spring 39. A flexible element here constituted as a chain 38 is connected at one end to an eye 42 formed adjacent the hook 44 and passes through the eye 37 so that when this chain 4 is pulled the hook 44 is pulled toward the eye, decreasing the diameter of the hoop 2e", and compressing the spring 39 until the hook 44 hooks in the eye 37. Once again the other end of this flexible element 38, here constituted as a chain, is secured to the outer holder by an arrangement such as shown at 10 or 17 in FIGS. 1 and 2, respectively.

Figure 14:
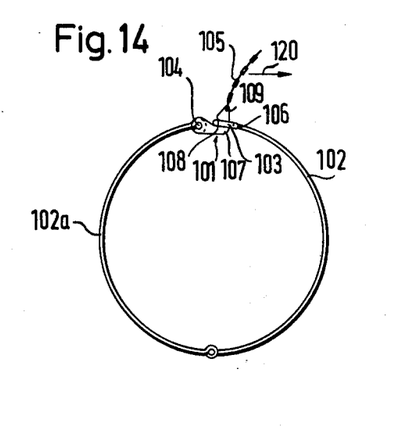
Figure 15:
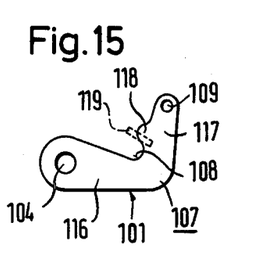
FIG. 15 is a large-scale view of a detail of FIG. 14.

In FIGS. 14 and 15 an inner holder is formed by a pair of hinged-together semi-circularly arcuate sections or members 102 and 102a interconnectable by means of a hooklike locking dog 101 shown in detail in FIG. 15. The one end portion 106 of the member 102 is formed with a ring 103 constituting an eye and opened generally radially of the circle formed by the members 102 and 102a. The dog 101 is stamped out of heavy metal plate and is formed with a hole 104 by which it is pivotal on the end portion of the other member 102a.

This dog 101 is generally hook-shaped or V-shaped and has one leg 116 which is formed at its outer end with the pivot hole 104 and another leg 117 formed at its outer end with a hole 109 connected to a chain 105 constituting the flexible element of the system. At the apex 107 between the two legs 116 and 117 there is formed a notch or crotch 108 which is engageable snugly over the ring 106. A bump 118 or pin 119 help to define the notch 108 and can hold the dog 101 locked on the eye 103.

For the arrangement of FIGS. 14 and 15 the hook or dog 101 is engaged in the eye 3 by merely pulling the chain 120 radially of the inner holder until the leg 117 passes through the eye 103. As soon as the eye 103 engages in the notch 108 the two are locked together and the only forces normally effective on the tire, that is radial forces, cannot unhook the elements from each other. In order to uncouple the two sections 102 and 102a and allow them to spread for removal of the tire-chain assembly the chain 105 is pulled in the direction shown by arrow 120 until the eye 103 passes over the bump 118 or pin 119 and out of the groove 108.

Figure 16:
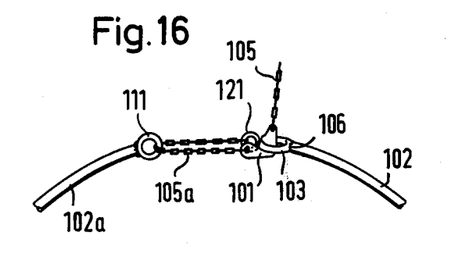
FIG. 16 is a side detail view of another inner holder in accordance with this invention.

FIG. 16 shows an arrangement substantially identical to that shown in FIGS. 14 and 15, but wherein the dog 101 is secured by means of a short endless chain 105a to an eye 111 carried on the end region of the other section 102a. A ring 121 provided on the chain 105a can be pulled laterally in order to shorten the distance between the dog 101 and the eye 111 and thereby adjust the diameter of the ring formed by the members 102 and 102a. It is noted that such lateral pulling of the ring 121 has a mechanical advantage, since two sections of the chain 105a extend between the dog 101 and the eye 111.

Figure 17:
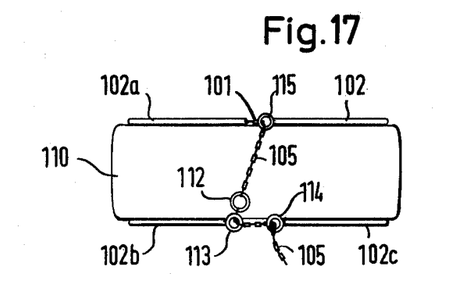
FIG. 17 is a bottom view showing details of an adjustment mechanism for a tire-chain assembly substantially as shown in FIGS. 10 and 11.

In FIG. 17 a tire 110 is shown having an inner holder identical to that described with reference to FIGS. 14 and 15. Here the chain 105 extends over the running surface of the tire 101 and passes through one eye 113 at one end of a section 102b of the outer holder whose other section 102c has an eye 114. The chain 105 passes through the eye 113 and through the eye 114 so that when this chain is pulled radially outwardly it will not only pull the dog 101 through the eye 106, but will pull the eyes 113 and 114 toward each other so that on the inside of the tire 110 the two sections 102 and 102a will be pulled together and on the outside the two sections 102b and 102c will be pulled together. The free outer end of the chain 105 is secured as described above. In addition this chain 105 is provided with a ring 112 of a size making it unable to fit through the eye 106. Thus, even if the chain becomes unhooked on the outside of the wheel or breaks outside the wheel, this ring 112 will ensure that the two elements 102 and 102a cannot spread beyond a predetermined given diameter. This prevents the system from merely springing open in case of damage or disconnection and ruining itself by being jammed between the tire and the wheel well of the vehicle. The system will simply loosen to a limited extent.

Figure 18:
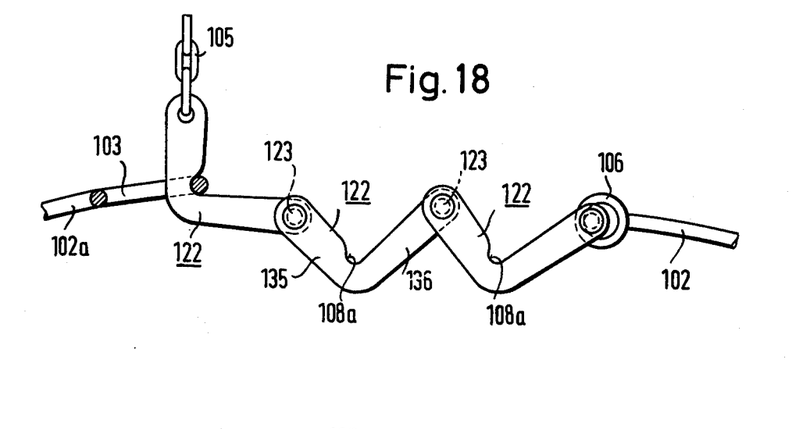
FIGS. 18, 19, 20, 21, 22, and 23 are all large-scale views of details of adjustment mechanisms for inner holders in accordance with the present invention.

In FIG. 18 a system is shown for connecting the two parts 102 and 102a of a holder formed substantially as shown in FIG. 16. This assembly comprises three identical V-shaped links 122 having arms 135 and 136 deining angles of between 60° and 150°. Three such links are provided here. The middle link 122 is pivoted at a pair of pivots 123 to the adjacent ends of the flanking links 122. The outermost link 122 is pivoted at its free end on the chain 105 and the innermost link 122 is pivoted at its inner end on the eye 111 of the section 102a. Each of these links 122 is formed between its arm 135 and 136 with a seat or crotch 108a substantially identical to the seat 108 shown in FIG. 15. With such an arrangement the chain 105 is pulled until the chains 12 are tight as desired. This will correspond generally to seating of the eye 103 in one of the notches 108a. Should the tire wear, the notch 108a of that link 122 closer to the eye 111 will be used.

Figure 19:
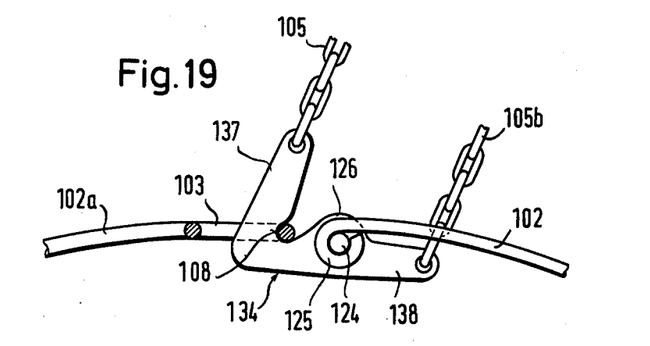

The arrangement shown in FIG. 19 again is employed in a system substantially identical to that shown in FIG. 16. Here a V-shaped or hook-type dog 134 is used which is pivoted on a pin 124 extending through an eye 125 similar to the eye 111 in the end of the section 102a. This pivot 126 passes through a region 126 midway in one arm 138 of the two-armed dog 134. Between the arms 137 and 138 of this dog 134 there is formed a seat 108b identical to the seat 108 of FIG. 15. The chain 105 is connected to the free end of the arm 137 so that this system works, as far as connecting-up the two parts 102 and 102a, the same as the system of FIGS. 14 and 15. Here, however, due to the central pivoting of the arm 138, a chain 105b connected to the free end of the arm 138 can be pulled in order to unhook the dog 134 from the eye 103. Such unlatching or swiveling means can greatly enhance the ease with which the tire-chain assembly is taken off the wheel.

Figure 20:
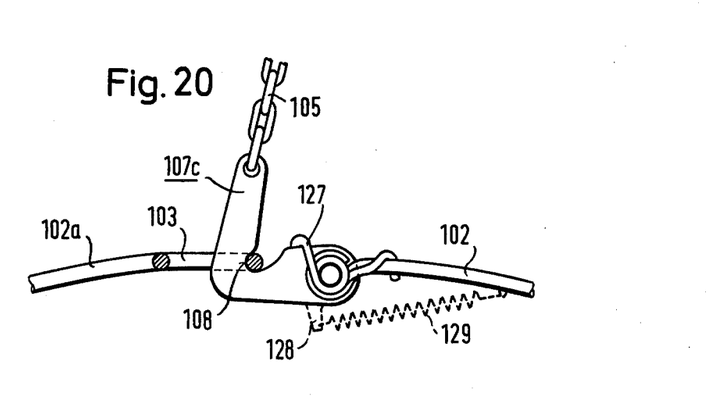

The arrangement shown in FIG. 20 uses a dog 107c substantially identical to that shown in FIG. 15. Here, however, a torsion spring 127 is wound around a pivot for the dog 107c so as to urge it normally in a direction tending to unhook it from the eye 103. Thus, once tension is released from the chain 105 the system should unhook itself, allowing the assembly to be easily taken off the wheel. It is also possible to provide a laterally projecting lug 128 and a helical tension spring 129 connected between the lug 128 on the dog 107c and the member 102a to rotationally bias the dog 107c in the same manner as the spring 127.

Figure 21:
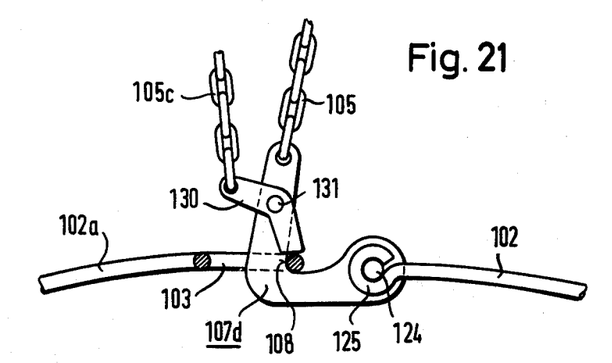

The arrangement of FIG. 21 shows a dog 107d identical to the dog 107c but not provided with any spring such as shown at 127 or 129. In addition this arrangement is provided with a pivot 131 on which is mounted a locking pawl 130 connected to a chain 105c. When the eye 103 lies in the seat 108 a pull on this chain 105c will pivot the pawl 130 in a direction so that the end of the pawl 130 will lock against the eye 103 and hold it tightly in the seat 108. Such an arrangement is particularly useful on heavy-duty installations where it is essential to provide the maximum protection against disconnection of the elements 102 and 102a.

Figure 22:
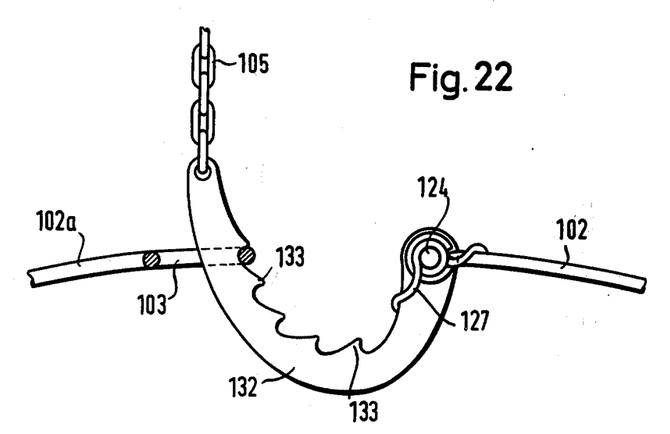

In FIG. 22 a system is shown wherein a sickle-shaped dog 132 is formed on its inner arcuate surface with a plurality of teeth 133 defining a plurality of seats. When this arrangement is pulled against the torsion spring 127 on the pivot 124 the teeth 133 will pass sequentially over the eye 103. As the dog 132 is pulled through the eye 103, therefore, the guide 103 will be moved ever closer to the pivot 124, thereby reducing the diameter of the holder constituted by the sections 102 and 102a.

Figure 23:
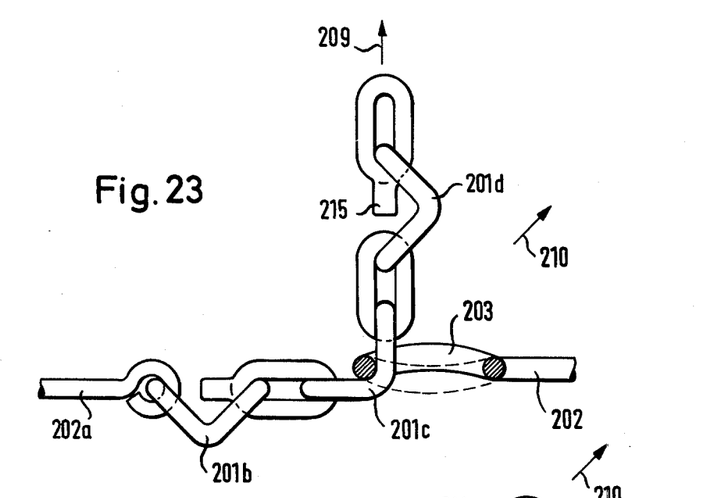
Figure 24:
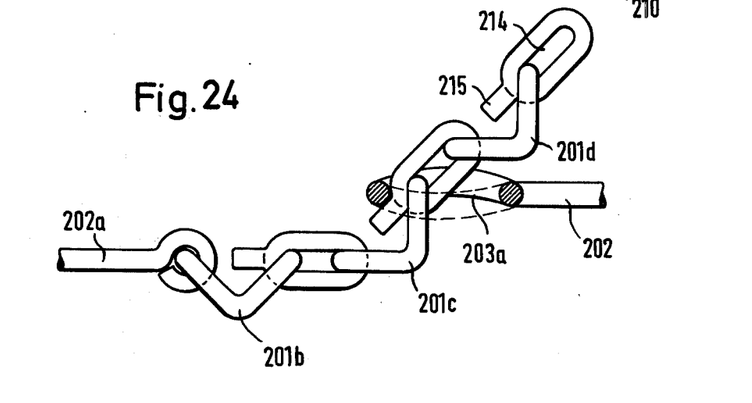
FIG. 24 is a view of the arrangement of FIG. 23 in another position.

In FIGS. 23 and 24 a system is shown wherein a pair of sections 202 and 202a respectively corresponding to the sections 102a and 102, respectively, are connected together by means of V-shaped dogs 201b, 201c, and 201d themselves interconnected by links 214. The chain constituted by these elements passes through an eye 203a formed at the end region of the member 202.

Thus, when the chain constituted by these members or a chain 205 connected thereto (see FIG. 25) is pulled in the direction of arrow 209 the various elements will be pulled sequentially through the eye 203a. At any time when the guide or eye 203a lies in the apex of a V-shaped member 201b, 201c, or 201d, it is possible for the system to be locked together, with only minor tension in the direction 209 being able to maintain the set position.

Each of the links 204 is provided, however, at its trailing end, relative to the direction of pulling through the eye 203a on tightening of the assembly, with a projection or lug 215 which, when the endmost link 214 is pulled in the direction of arrow 210 as shown in FIG. 24 will cam the respective dog 201b, 201c, 201d away from the guide eye 203a and allow the various members to slip through the eye 203a. This eye 203a may be dished as shown in dot-dash lines rather than in the direction shown in solid lines.

Figure 25:
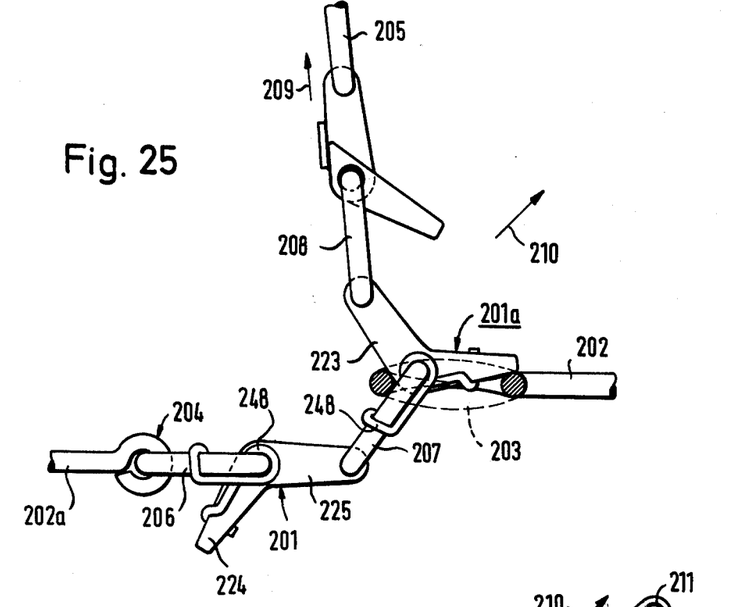
FIGS. 25 and 26 are views corresponding to FIGS. 23 and 24, respectively, illustrating another arrangement in accordance with this invention.
Figure 26:
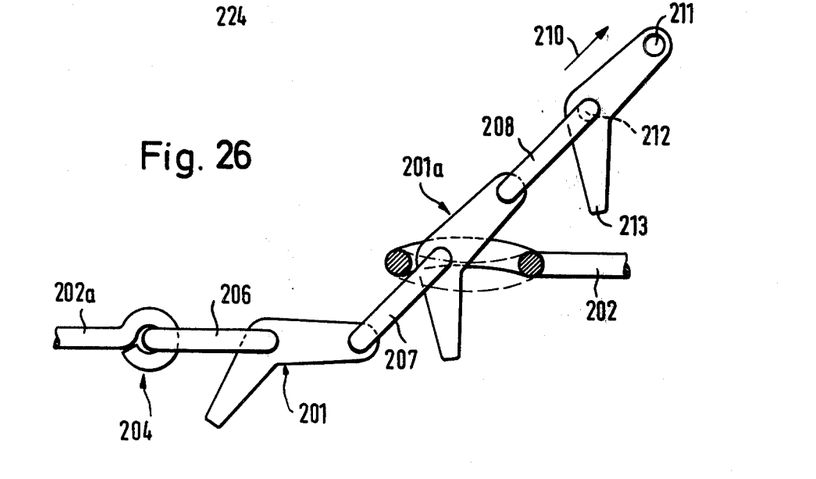

In FIGS. 25 and 26 a system is shown wherein the chain 205 is connected to an eye 204 formed on the end of the member 202a by means of a plurality of generally V-shaped dogs 201 interconnected by regular links 207 and 208 and connected to the eye 204 by means of a link 206. Each link 201 has a pair of arms 224 and 225 extending at an obtuse angle to each other. At the end of the leading arm 225 there is formed a round-section hole 211 for the respective link 206-208, and at the apex between the two arms 224 and 225 there is formed another hole 212 for the other end of the respective link. Thus, each arm 224 has a free end 213 which is normally the trailing end when the assembly is pulled in the direction 209 through the eye 203. The springs 248 are provided to normally bias the dogs 201 counterclockwise, that is with the arms 224 that normally lead trying to align themselves with the respective trailing link.

In use when a pull is exerted in the direction 209 on the chain 205 the holes 211 and 212 will align themselves with the direction of pull and the dogs 201 can then be sequentially pulled through the eye 203. As soon as the inner holder is sufficiently tight the user then need merely relax somewhat the pressure on the chain 205. This will allow the links outside the guide eye 203 at least to pivot somewhat counterclockwise, so that when the chain formed by these links and dogs moves backwardly slightly the rear surface of the arm 224 will come to rest on the eye 203 and it will be impossible to pull one of the links 201 back through this eye 203, thereby achieving a self-locking action.

When, however, it is desired to take the tire-chain assembly off, a pull need merely be exerted in a direction 210 at an angle forwardly of the direction 209 on the chain 205. This will pivot the links 201 around into a position allowing them to pass through the guide eye 203 as shown in FIG. 26.

Figure 27:
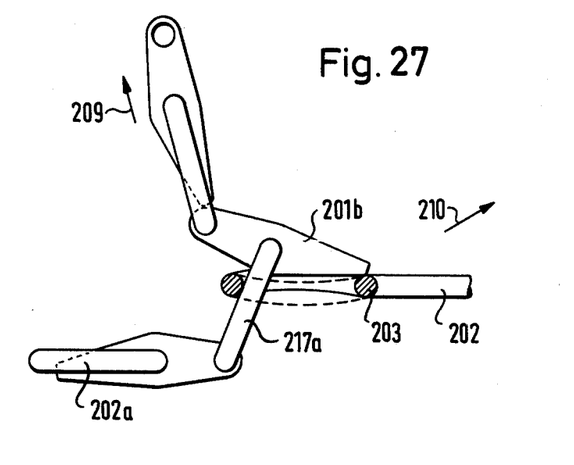
FIG. 27 is a large-scale detail view of yet another adjustment locking arrangement according to this invention.

FIG. 27 shows an arrangement identical to that of FIGS. 25 and 26 except that here the straight links 201b are employed which function substantially identically to the links 201, and which are interconnected by means of links 217a. The members 201 and 201b are stamped out of steel plate, and the links 217 and 206-208 are formed as typical welded chain links. It is also, of course, possible to use plate links for both set-ups.

Figure 27A:
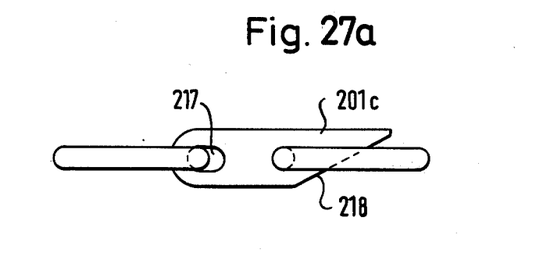
FIGS. 27a, 27b, 28, and 28a are detail views of locking chains usable in accordance with this invention.

In FIG. 27a a dog 207c is employed formed at one end with a slightly elongated slot 217 and formed with a chamfer 218 at its other end, giving it a pointed shape. This length will function identically to the link 201b of FIG. 27. It is also possible to use elongated slots such as shown at 217 in the arrangements described previously, or to use a tight-fitting hole as shown at 211 and 212 in FIG. 27a.

Figure 27B:
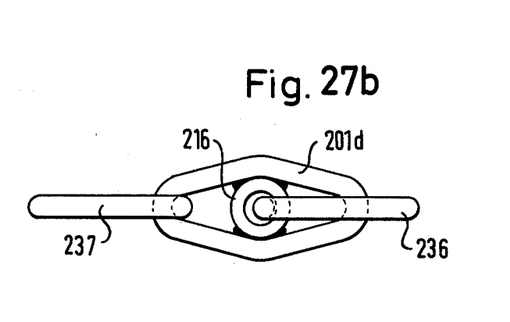

In FIG. 27b a link-type dog 201d is shown into whose very center is welded an eye 216. One link 236 is pivoted in the eye 216 and another link 237 is pivoted outside the eye 216 in one end of the link 201d. This arrangement, once again, functions the same as the arrangement of FIG. 27, but can be produced at considerably lower cost.

Figure 28:
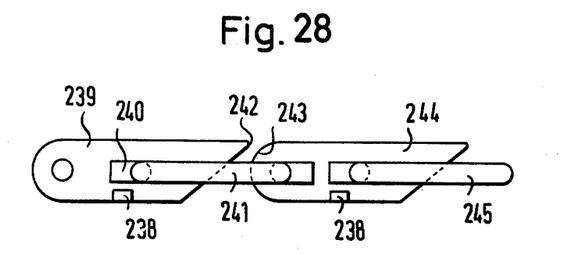
Figure 28A:
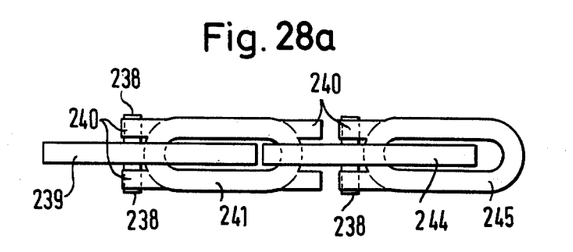

The arrangement of FIGS. 28 and 28a has the particular advantage that it is impossible for it to become knotted up and hard to unwind before use, and similarly the chains constituted by the links shown in these Figures will always lie flat. Here, a pair of identical link-type dogs 239 and 244 substantially the same as the arrangement in FIG. 27a are provided interconnected by means of links 241 and 245. Each of the links 241 and 245 is pivoted in the center of the respective dog 239 at its rear end and the link 241 is pivoted at its forward end in the rear of the leading dog 239. These dogs 239 have chamfered and pointed ends 242 each of which can just pivot past the rear surface 243 of the dog 239 immediately preceding it in the direction of pulling of the assembly during tightening of the inner holder. Furthermore, each of the links 241 is provided at its front and rear ends with projections 240. The projections 240 at the rear ends are arranged above lateral studs or projections 238 on the dogs 239. Thus, it is impossible for the chain to twist in the wrong direction and become fouled, as if the link 241 or 244 attempts to move upward relative to the following dog 239 or 244 the projections 240 at the rear end of these links will strike the underlying projections 238 and pivot the entire dog upwardly, ensuring proper alignment during pulling of the chain thus formed through the respective eye 203.

Figure 29:
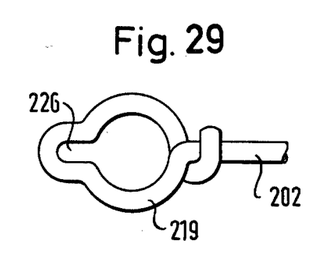
FIG. 29 is a large-scale view of a chain holder in accordance with this invention.

FIG. 29 shows how an eye 219 can replace the eye 203 and be formed with a notch 226 which lies in the same plane as the respective arcuate member 202 and is opened back toward this respective member 202. Thus, when an assembly such as shown in FIGS. 28 and 28a is pulled through it the chain links 239 and 244 will automatically lock in it. It is even possible to pull a standard chain through it and lock it, although dislodging it becomes a problem thereafter.

Figure 30:
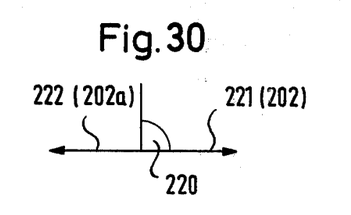
FIG. 30 is a diagram illustrating operation of the system in accordance with this invention.

FIG. 30 illustrates how under normal circumstances the force pulling on the tightening means by the section 202a is directed in a direction 222 directly opposed to the force 221 exerted thereon by the element 202. The disconnecting force 220, however, is at right angles thereto so that under normal circumstances the arrangement will not disconnect itself. This arrangement is therefore self-locking, as the force 220 here is at an angle of 90° to the two forces 221 and 222.

Figure 31:
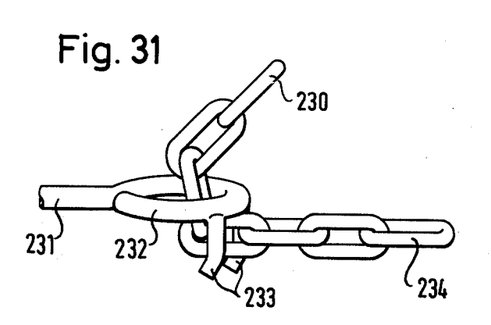
FIGS. 31 and 32 are side and top views, respectively, showing another chain holder according to the present invention.
Figure 32:
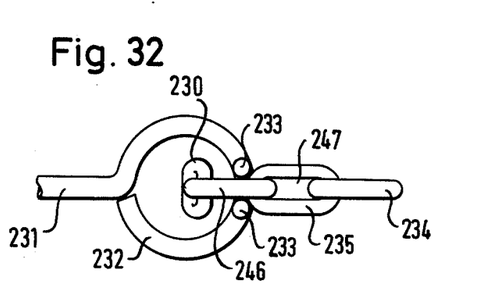

The arrangement shown in FIGS. 31 and 32 uses a standard chain 230 having half its links 234 arranged in one plane and the other half of its links 235 arranged in a plane orthogonal thereto. In this arrangement one end of a holder section 231 comparable to, for example, section 201 is formed with a large-diameter eye 232 provided with a fork 233 sufficiently wide only to pass a link oriented parallel to the two pins forming the fors 233. Thus, when the chain 230 is pulled through the eye 231 it will be possible very easily to lock a vertical link such as shown at 246 in the fork 233, whereas the following link 247 will have to be pulled completely over it. It will be possible to secure the one end of this chain 230 simply to the other member corresponding to the member 231 for a very simple and inexpensive locking arrangement.

With the system according to the present invention it is therefore possible in a very simple manner to mount a very secure and long-lasting tire-chain assembly on the wheel of a vehicle, even while this wheel is standing on the ground. Even working one-handed it is possible in a very simple and speedy manner to mount the tire-chain assembly as described above on the motor-vehicle wheel.

It will be understood that each of the elements described above, or two or more together, may also find a useful application in other types of constructions differing from the types described above.

While the invention has been illustrated and described as embodied in a tire-chain assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tire chain assembly for a vehicle-mounted wheel having an inner face and an outer face separated by a peripheral ground-engaging surface, said assembly comprising (a) a rod formed with an inner bight constituting an inner holder of variable shape on said inner face, an outer bight constituting an outer holder on said outer face, and a pair of connection parts interconnecting said holders and lying on saig ground-engaging surface; (b) at least one traction chain extending back and forth between said holders over said ground engaging surface; (c) means connected to said inner holder and including a flexible elongated and generally nonextensible element extending over said ground-engaging surface to said outer face for varying said shape of said inner holder and thereby tightening said chain on said surface on withdrawal of said element toward said outer face, said means further including an anchor on one of said connection parts for one end of said flexible element and a guide on the other of said connection parts, said flexible element passing through said guide, whereby pulling of the other end of said flexible element draws said connection parts together on said ground-engaging surface; and (d) means on said outer holder for securing the other end of said flexible element thereon and thereby arresting the tightening means in the position determined by said element to maintain the shape of said outer element without change.

2. The assembly defined in claim 1 wherein said outer holder is a ring of fixed diameter, said inner ring having a pair of relatively stiff arcuate sections and a flexible portion interconnecting said sections.

3. The asembly defined in claim 1 wherein said inner holder has a pair of end portions whose relative spacing on said inner face is generally proportional to the size of said inner diameter, said tightening means including a formation on one of said end portions, said flexible element including a link-type locking dog pivotal but connected to the other of said end portions and lockingly engageable with said formation.

4. The assembly defined in claim 3 wherein said flexible element includes a plurality of links connected together with said dog chain-fashion, said dog having a pair of ends, one of which is pivoted on one of said links, and a central region which is pivoted on another of said links, said formation being an eye, said dog being shaped and constructed to pass longitudinally through said eye but being unable to pass through said eye when oriented transversely thereto.

5. The assembly defined in claim 4 wherein said dog is generally straight.

6. The assembly defined in claim 4 wherein said dog is V-shaped with an apex at said central region.

7. The assembly defined in claim 5 wherein said formation is an eye on said one end portion, said dog being formed as a hook engageable through and with said eye, said hook having one end connected to said one end of said flexible element.

8. The assembly defined in claim 7 wherein said tightening means includes a plurality of chain-type links alternating with a plurality of such dogs and connected chain-fashion between said one end of said flexible element and said other end portion of said inner holder.

9. The assembly defined in claim 7 wherein said dog is pivotable on said other end portion, said assembly further comprising means connected to said dog for pivoting said dog on said other end portion in a direction unhooking said dog from said eye.

10. A tire-chain assembly for a vehicle-mounted wheel having an inner face and an outer face separated by a peripheral ground-engaging surface, said assembly comprising a first shape-retaining holder of resiliently yieldable material and consisting of at least two portions which are permanently connected to one another when said first holder is on the tire as well as when it is off the tire; a second shape-retaining holder of resiliently yieldable material and consisting of at least two portions which are also permanently connected to one another when said second holder is on the tire as well as when it is off the tire; at least one traction chain extending back and forth between said holders over said ground-engaging surface; an element having one end rigidly connected to the first holder and another end, said element connecting said holders to each other and being operative for tightening said chain on said surface upon withdrawal of said element in direction toward said second holder; and a member on said second holder for securing the other end of said element thereon and thereby arresting said holders in positions determined by said element.

11. An assembly as defined in claim 10, wherein said first holder is an inner holder on said inner face of the wheel.

12. An assembly as defined in claim 11, wherein said second holder is an outer holder on said outer face of the wheel.

13. An assembly as defined in claim 12; further comprising means for withdrawing said element relative to said inner holder in direction toward said outer holder so as to change the shape of said inner and outer holders and thereby tighten said chain on said surface.

14. An assembly as defined in claim 13, wherein said securing member is provided on said outer holder for securing said other end of said element on said outer holder.

* * * * *